US006416893B1

United States Patent
Clingerman et al.

(10) Patent No.: US 6,416,893 B1
(45) Date of Patent: Jul. 9, 2002

(54) METHOD AND APPARATUS FOR CONTROLLING COMBUSTOR TEMPERATURE DURING TRANSIENT LOAD CHANGES

(75) Inventors: Bruce J. Clingerman, Palmyra; Robert W. Chalfant, West Henrietta, both of NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/502,725

(22) Filed: Feb. 11, 2000

(51) Int. Cl.[7] ................................................. H01M 8/06
(52) U.S. Cl. .............................. 429/17; 429/20; 429/24
(58) Field of Search .............................. 429/13, 17, 19, 429/20, 24

(56) References Cited

U.S. PATENT DOCUMENTS

| | | | |
|---|---|---|---|
| 3,539,397 A | * | 11/1970 | Keating et al. ............ 429/24 X |
| 3,976,506 A | * | 8/1976 | Landau ........................ 429/17 |
| 3,976,507 A | * | 8/1976 | Bloomfield ............... 429/19 X |
| 4,128,700 A | | 12/1978 | Sederquist |
| 4,293,315 A | | 10/1981 | Sederquist |
| 4,555,454 A | | 11/1985 | Shuster |
| 4,642,272 A | | 2/1987 | Sederquist |
| 4,650,727 A | | 3/1987 | Vanderborgh et al. |
| 4,659,634 A | | 4/1987 | Struthers |
| 4,670,359 A | | 6/1987 | Beshty et al. |
| 4,678,723 A | | 7/1987 | Wertheim |
| 4,816,353 A | | 3/1989 | Wertheim et al. |
| 4,923,768 A | | 5/1990 | Kaneko et al. |
| 4,943,493 A | * | 7/1990 | Vartanian ..................... 429/17 |
| 4,994,331 A | | 2/1991 | Cohen |
| 5,248,567 A | | 9/1993 | Amemiya et al. |
| 5,271,916 A | | 12/1993 | Vanderborgh et al. |
| 5,272,017 A | | 12/1993 | Swathirajan et al. |
| 5,316,871 A | | 5/1994 | Swathirajan et al. |
| 5,334,463 A | * | 8/1994 | Tajima et al. ............. 429/24 X |
| 5,372,617 A | | 12/1994 | Kerrebrock et al. |
| 5,429,886 A | | 7/1995 | Struthers |
| 5,484,577 A | | 1/1996 | Buswell et al. |
| 5,484,666 A | | 1/1996 | Gibb et al. |
| 5,518,705 A | | 5/1996 | Buswell et al. |

(List continued on next page.)

FOREIGN PATENT DOCUMENTS

| | | | |
|---|---|---|---|
| JP | 10-21946 | * | 1/1998 |
| WO | WO 98/08771 | | 3/1998 |

OTHER PUBLICATIONS

Szaniszlo, "The Advanced Low–Emissions Catalytic–Combustor Program: Phase I—Description and Status," ASME #79–GT–192 (Mar. 1979).
Krill et al., "Catalytic Combustion for System Apoplications," ASME #79–HT–54 (Dec. 1979).
Hall et al., "A Porous Media Burner for Reforming Methanol for Fuel Cell Powered Electric Vehicles," SAE Paper #950095 (Mar. 1995).
Natural Gas Power Plant System (a descriptive drawing) (Date unknown).

*Primary Examiner*—Stephen Kalafut
(74) *Attorney, Agent, or Firm*—Karl F. Barr, Jr.; Cary W. Brooks; Linda M. Deschere

(57) ABSTRACT

A method and apparatus for controlling the temperature of a combustor in a fuel cell apparatus includes a fast acting air bypass valve connected in parallel with an air inlet to the combustor. A predetermined excess quantity of air is supplied from an air source to a series connected fuel cell and combustor. The predetermined excess quantity of air is provided in a sufficient amount to control the temperature of the combustor during start-up of the fuel processor when the load on the fuel cell is zero and to accommodate any temperature transients during operation of the fuel cell.

16 Claims, 2 Drawing Sheets

U.S. PATENT DOCUMENTS

| | | |
|---|---|---|
| 5,518,828 A | 5/1996 | Senetar |
| 5,554,453 A | 9/1996 | Steinfeld et al. |
| 5,605,770 A | 2/1997 | Andreoli et al. |
| 5,637,415 A | 6/1997 | Meltser |
| 5,702,838 A | 12/1997 | Yasumoto et al. |
| 5,763,113 A | 6/1998 | Meltser et al. |
| 5,789,091 A | 8/1998 | Wozniczka et al. |
| 5,981,096 A * | 11/1999 | Hornburg et al. ............. 429/17 |

* cited by examiner

METHOD AND APPARATUS FOR CONTROLLING COMBUSTOR TEMPERATURE DURING TRANSIENT LOAD CHANGES

GOVERNMENT SUPPORT

The Government of the United States of America has right in this invention pursuant to Agreement No. DE-AC02-90CH10435 awarded by the U.S. Department of Energy.

FIELD OF THE INVENTION

This invention relates to a fuel cell system and, more particularly, to combustors for heating a fuel processor which generates a $H_2$rich gas for the fuel cell.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which (1) serve as current collectors for the anode and cathode, and (2) contain appropriate channels and/or openings therein for distributing the fuel cells gaseous reactants over the surfaces of the respective anode and cathode catalysts. The term fuel cell is typically used to refer to either a single cell or a plurality of cells (stack) depending on the context. A plurality of individual cells are commonly bundled together to form a fuel cell stack and are commonly arranged in series. Each cell within the stack comprises the membrane electrode assembly (MEA) described earlier, and each such MEA provides its increment of voltage. A group of adjacent cells within the stack is referred to as a cluster. Typical arrangements of multiple cells in a stack are described in U.S. Pat. No. 5,763,113, assigned to General Motors Corporation.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

For vehicular applications, it is desirable to use a liquid fuel such as an alcohol (e.g., methanol or ethanol), or hydrocarbons (e.g., gasoline) as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished within a chemical fuel processor or reformer. The fuel processor contains one or more reactors wherein the fuel reacts with steam and sometimes air, to yield a reformate gas comprising primarily hydrogen and carbon dioxide. For example, in the steam methanol reformation process, methanol and water (as steam) are ideally reacted to generate hydrogen and carbon dioxide. In reality, carbon monoxide and water are also produced. In a gasoline reformation process, steam, air and gasoline are reacted in a fuel processor which contains two sections. One is primarily a partial oxidation reactor (POX) and the other is primarily a steam reformer (SR). The fuel processor produces hydrogen, carbon dioxide, carbon monoxide and water. Downstream reactors such as a water/gas shift (WGS) and preferential oxidizer (PROX) reactors are used to produce carbon dioxide ($CO_2$) from carbon monoxide (CO) using oxygen from air as an oxidant. Here, control of air feed is important to selectively oxidize CO to $CO_2$.

Fuel cell systems which process a hydrocarbon fuel to produce a hydrogen-rich reformate for consumption by PEM fuel cells are known and are described in co-pending U.S. patent application Ser. Nos. 08/975,422 and 08/980,087, filed in November, 1997, and U.S. Ser. No. 09/187,125, filed in November, 1998, and each assigned to General Motors Corporation, assignee of the present invention; and in International Application Publication Number WO 98/08771, published Mar. 5, 1998. A typical PEM fuel cell and its membrane electrode assembly (MEA) are described in U.S. Pat. Nos. 5,272,017 and 5,316,871, issued respectively Dec. 21, 1993 and May 31, 1994, and assigned to General Motors Corporation.

In such typical fuel cell systems, a compressor or other air source supplies air to a fuel cell stack containing a number of individual fuel cells and to a combustor. The stack uses the air and hydrogen to generate electricity.

The stack, however, requires more air flow than it consumes based on the amperage demand or load. The combustor, on the other hand, needs a precise amount of air to maintain proper operating temperature. The air flow through the combustor must change as the fuel or hydrogen supplied to the combustor changes. However, the fuel processor cannot shutdown in milliseconds, so as the load falls, hydrogen flow to the combustor rises temporarily. Without an air flow changing at the same rate as the fuel hydrogen flow rate, the combustor may quickly overheat.

Efficient operation of a fuel cell system depends, in part, on the ability to effectively control the temperature of the combustor during all load conditions and, in particular, during transient load changes. This is particularly difficult during transient operation of a vehicular fuel cell system wherein the reformate fuel requirements and, thereby, the combustor output requirements vary with the changing loads placed on the fuel cell.

Therefore, it is desirable to provide a method and apparatus for controlling the temperature of a combustor particularly during dynamic fuel cell system operation. It would also be desirable to provide a method and apparatus for controlling combustor temperature under all load conditions by controlling the supply of a reserve quantity of air to the combustor. It would also be desirable to provide a method and apparatus for controlling combustor temperature which can be easily implemented in existing fuel cell systems.

SUMMARY OF THE INVENTION

A control method and apparatus for controlling the temperature of a combustor in a fuel cell apparatus in which unused oxygen from the cathode outlet of a fuel cell is supplied to the combustor along with a separate air flow stream from an air source or compressor.

In one aspect of the present invention, the control method comprises the steps of:
- connecting a cathode effluent outlet of a fuel cell to the combustor;
- connecting an air flow path through the fuel cell and a combustor air flow path in series with a air supply;
- supplying a predetermined excess quantity of air from the air supply to the fuel cell and the combustor, which excess quantity of air is in excess of the air consumed by the fuel cell and the combustor during operation;
- providing an air flow bypass path in the air flow to the combustor; and
- controlling the amount of the excess quantity of air which bypasses the combustor to control the temperature of the combustor under all load conditions.

In another aspect of the invention, the step of supplying the excess quantity of air comprises the step of supplying the excess quantity of air which bypasses the combustor in a first predetermined amount during start-up of the fuel processor and in a second predetermined amount when the fuel processor reaches a nominal run condition. Preferably, the amount of air bypassing the combustor is slowly decreased from the first amount to the second amount during transition of the fuel processor from start up to run.

The step of supplying the excess quantity of air is implemented by connecting a fast response air bypass valve in a parallel air flow path with an air flow inlet path to the combustor.

In another aspect, the air demand supplied by the compressor is the greater of the product of the load air requirement and the cathode lambda, or the product of the combustor air requirement and the air lambda, where the cathode lambda is the ratio of oxygen sent to the fuel cell stack and the combustor to the oxygen consumed by the stack, and the air lambda is the ratio of the total air sent to the combustor and air bypass valve to the air sent to the combustor.

In another aspect of the present invention, the control apparatus includes a cathode effluent outlet of a fuel cell connected to the combustor. An air flow path through the fuel cell and an air flow path through the combustor are connected in series with an air supply. Means are provided for supplying a predetermined excess quantity of air from the air supply to the fuel cell and the combustor, which excess quantity of air is in excess of the air consumed by the fuel cell and the combustor during operation. An air flow bypass path is formed around the combustor. Finally, means are provided for controlling the amount of the predetermined excess quantity of air which bypasses the combustor to control the temperature of the combustor under any load condition.

In a specific aspect of the invention, the controlling means controls the air supply to supply the excess quantity of air which bypasses the combustor in a first amount during startup of the fuel processor and in a second predetermined amount when the fuel processor reaches a nominal run condition. Preferably, the second amount of air is less than the first amount of air. The controlling means also slowly decreases the excess quantity of air bypassing the combustor from the first amount to the second amount during transition of the fuel process from startup to run modes.

In one aspect, the means for supplying the excess quantity of air comprises a fast response air bypass valve connected in a parallel air flow path with the air flow inlet path to the combustor.

The control method and apparatus of the present invention provides unique control over the temperature of the combustor in a fuel cell apparatus under all operating or load conditions including start-up when there is no load on the fuel cell as well as during normal operating or run conditions wherein the load on the fuel cell can change quickly. The inventive control method and apparatus ensures that a buffer or excess supply of air is readily available to the combustor to prevent overheating temperatures in the combustor when more than normal quantities of hydrogen fuel are quickly supplied to the combustor from the fuel cell.

The inventive method and apparatus enables the operating temperature of the combustor to be controlled in an efficient series connected fuel cell and combustor arrangement. In addition, an economical and small size, slow response air source or compressor may be employed since the inventive control method and apparatus ensures that a sufficient quantity of air is present in the fuel cell apparatus to accommodate transient air demands placed on the combustor despite any high rate of change of the fuel quantity supplied to the combustor.

BRIEF DESCRIPTION OF THE DRAWINGS

The various features, advantages and other uses of the present invention will become more apparent by referring to the following description and drawing in which.

DETAILED DESCRIPTION OF THE PREFERRED EMBODIMENT

The present invention is a method and apparatus for controlling combustor temperature during all load conditions of a fuel cell system, such as a fuel cell system described hereafter, by example only, which is used as a source of motive power for propelling a vehicle.

Figure 1:
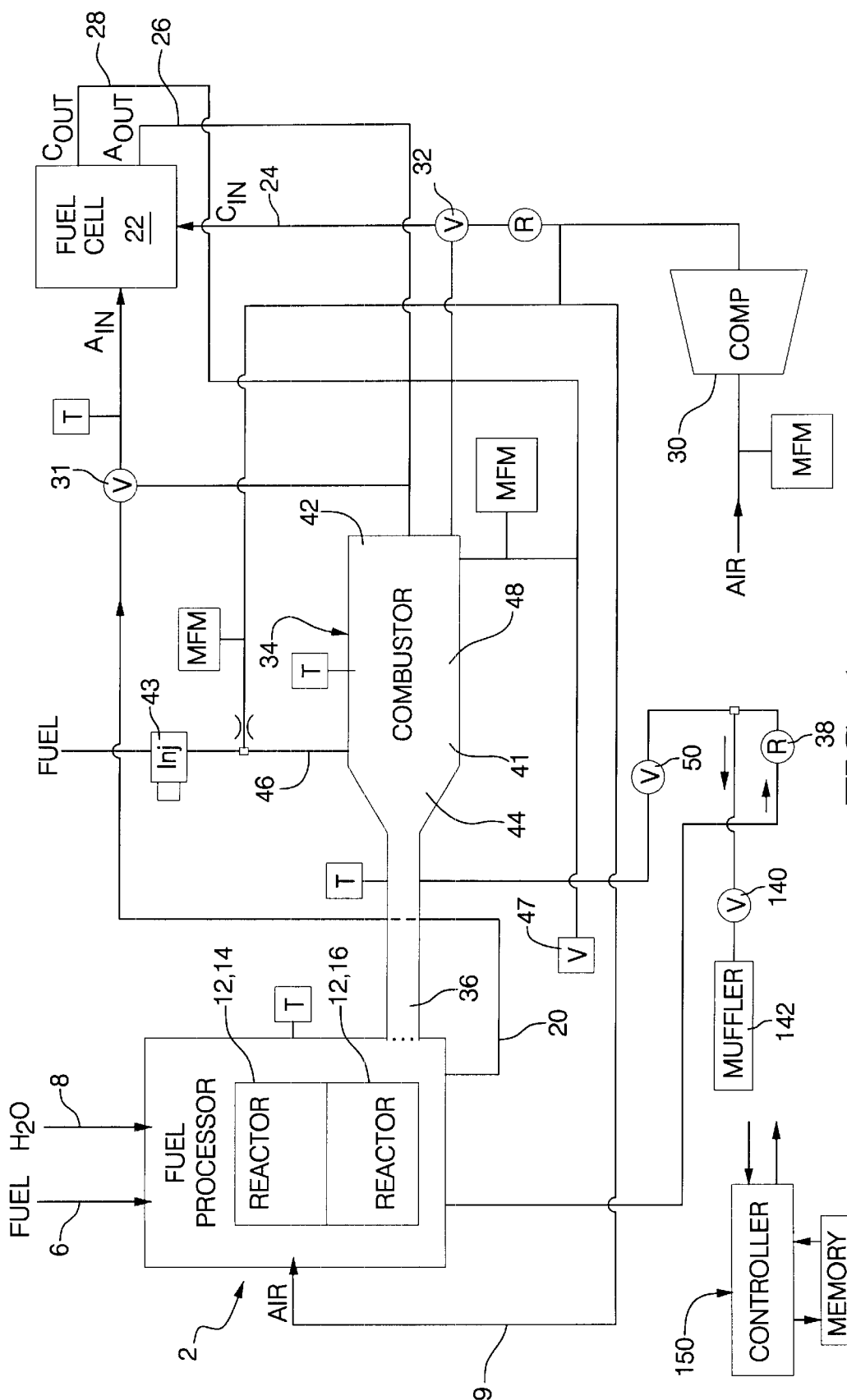
FIG. 1 is a flow diagram depicting a fuel cell system which can utilize the combustor temperature control method and apparatus of the present invention.

The features and advantages of the present invention may be further understood with reference to the fuel cell system shown in FIG. 1 by example only. Therefore, before further describing the invention, it is useful to understand the fuel cell system within which the present invention can be implemented.

FIG. 1 illustrates an example of a fuel cell system. The system may be used in a vehicle (not shown) as an energy source for vehicle propulsion. In the system, a hydrocarbon is processed in a fuel processor, for example, by reformation and preferential oxidation processes, to produce a reformate gas which has a relatively high hydrogen content on a volume or molar basis. Therefore, reference is made to hydrogen-rich or relatively high hydrogen content reformate.

The invention is hereafter described in the context of a fuel cell fueled by an $H_2$-rich reformate regardless of the method by which such reformate is made. It is to be understood that the principles embodied herein are applicable to fuel cells fueled by $H_2$ obtained from any source, including reformable hydrocarbon and hydrogen-containing fuels such as methanol, ethanol, gasoline, alkene, or other aliphatic or aromatic hydrocarbons.

As shown in FIG. 1, a fuel cell apparatus includes a fuel processor 2 for catalytically reacting a reformable hydrocarbon fuel stream 6, and water in the form of steam from a water stream 8. In some fuel processors, air is also used in a combination preferential oxidation/steam reforming reaction. In this case, fuel processor 2 also receives an air stream 9. The fuel processor contains one or more reactors 12 wherein the reformable hydrocarbon fuel in stream 6 undergoes dissociation in the presence of water/steam 8 and sometimes air (in stream 9) to produce the hydrogen-rich reformate. Further, each reactor 12 may comprise one or more reactor beds. Reactor 12 may have one or more sections or beds, and a variety of designs are known and usable. Therefore, the selection and arrangement of reactors 12 may vary; and exemplary fuel reformation reactor(s) 14 and downstream reactor(s) 16 are described immediately below.

By way of example, in an exemplary steam/methanol reformation process, methanol and water (as steam) are ideally reacted in a reactor 14 to generate hydrogen and carbon monoxide as described earlier in the background. In reality, carbon monoxide and water are also produced. By way of further example, in an exemplary gasoline reformation process, steam, air and gasoline are reacted in a fuel processor which comprises a reactor 14 which has two sections. One section of the reactor 14 is primarily a partial oxidation reactor (POX) and the other section of the reactor is primarily a steam reformer (SR). As in the case of methanol reformation, gasoline reformation produces the desired hydrogen but, in addition, produces carbon dioxide, water and carbon monoxide. Therefore, after each type of reformation, it is desirable to reduce the carbon monoxide content of the product stream.

Accordingly, the fuel processor typically also includes one or more downstream reactors 16, such as water/gas shift (WGS) and preferential oxidizer (PROX) reactors which are used to produced carbon dioxide from carbon monoxide, as described earlier in the background. Preferably, the initial reformate output gas stream which comprises hydrogen, carbon dioxide, carbon monoxide and water is further treated in a preferential oxidation (PROX) reactor 16 to reduce the CO-levels therein to acceptable levels, for example, below 20 ppm. The $H_2$ rich reformate 20 is then fed through valve 31 into the anode chamber of a fuel cell 22. At the same time, oxygen (e.g., air) from an oxidant stream 24 is fed into the cathode chamber of the fuel cell 22. The hydrogen from the reformate stream 20 and the oxygen from the oxidant stream 24 react in the fuel cell 22 to produce electricity.

Exhaust or effluent 26 from the anode side of the fuel cell 22 contains some unreacted hydrogen. The exhaust or effluent 28 from the cathode side of the fuel cell 22 contains some unreacted oxygen. Air for the oxidant stream 24 is provided by an air supply, preferably compressor 30. Air from the air supply (compressor 30) is directed to the fuel cell 22 by a valve 32 under normal operating conditions. During start-up, however, the valve 32 is actuated to provide air to the input of a combustor 34. The air is used in combustor 34 to react with a fuel supplied through line 46. The heat of combustion is used to heat various parts of the fuel processor 2.

It should be noted that some of the reactions which occur in fuel processor 2 are endothermic and so require heat; other reactions are exothermic and require removal of heat. Typically, the PROX reactor 16 requires removal of heat. One or more of the reformation reactions in reactor 14 are typically endothermic and require heat be added. This is typically accomplished by preheating reactants, fuel 6, steam 8, and air 9 and/or by heating selected reactors.

Heat from the combustor 34 heats selected reactors and reactor beds in the fuel processor 2 during start-up. The combustor 34 achieves heating of the selected reactors and beds in the fuel processor, as necessary, by indirect heat transfer thereto. Typically, such indirectly heated reactors comprise a reaction chamber with inlet and an outlet. Within the reaction chamber, the beds are in the form of carrier member substrates each having a first surface carrying catalytically active material for accomplishing the desired chemical reactions. A second surface opposite the first surface is for heat transfer from hot gases to the carrier member substrates. In addition, the combustor 34 is usable to preheat the fuel 6, water 8 and air 9 being supplied as reactants to the fuel processor 2.

It should be noted that the air 9 supplied to the fuel processor 2 may be used in one or more of the reactors 12. If reactor 14 is a gasoline reformation reactor, then air from line 9 is supplied to reactor 14. The PROX reactor 16 also utilizes air to oxidize CO to $CO_2$ and also receives air from air supply source (compressor 30) via line 9.

The combustor 34 defines a chamber 41 with an inlet end 42, an exhaust end 44 and a catalyst section 48 between the ends. Hydrocarbon fuel is injected into the combustor. The hydrocarbon fuel, if in liquid form, is preferably vaporized either before being injected into the combustor or in a section of the combustor to disperse the fuel for combustion. Vaporization may be done by an electric heater. Once the system is operating and the combustor has heated up, vaporization may occur by heat exchange using heat from the combustor exhaust to vaporize incoming fuel. Preferably, a fuel metering device 43 is provided to control the rate at which hydrocarbon fuel is provided to the combustor.

The hydrocarbon fuel 46 and the anode effluent 26 are reacted in the catalyst section 48 of the combustor 34, which section is between the inlet and exhaust ends 42 and 44, respectively, of the combustor 34. Oxygen is provided to the combustor 34 either from the air supply (i.e., compressor 30) via valve 32 or from a second air flow stream, such as a cathode effluent stream 28, depending on system operating conditions. A valve 50 permits dumping of the combustor exhaust 36 to atmosphere when it is not needed to heat reactors in the fuel processor 2.

As can be seen, the hydrocarbon fuel stream 46 supplements the anode effluent 26 fuel for the combustor 34, as may be needed, to meet the transient and steady state needs of the fuel cell apparatus. In some situations, exhaust gas passes through a regulator 38, a shutoff valve 140 and a muffler 142 before being released to the atmosphere. In FIG. 1, the symbols are as follows: V is a valve, MFM is a mass flow meter, T is a temperature monitor, R is a regulator, C is the cathode side of the fuel cell, A is the anode side of the fuel cell, INJ is an injector, and COMP is compressor The amount of heat demanded by the selected reactors with the fuel processor 2, which is to be supplied by the combustor 34, is dependent upon the amount of fuel and water input and ultimately the desired reaction temperature in the fuel processor 2. As stated earlier, sometimes air is also used in the reformation reactor and must also be considered along with the fuel and water input. To supply the heat demand of the fuel processor 2, the combustor 34 utilizes all anode exhaust or effluent and potentially some hydrocarbon fuel. Enthalpy equations are used to determine the amount of cathode exhaust air to be supplied to the combustor 34 to meet the desired temperature requirements of the combustor 34 and ultimately to satisfy the fuel processor 2. The oxygen or air provided to the combustor 34 includes one or both of cathode effluent exhaust 28, which is typically a percentage of the total oxygen supplied to the cathode of the fuel cell 22, and a compressor 30 output air stream depending on whether the apparatus is operating in a start-up mode wherein the compressor 30 air stream is exclusively employed, or in a run mode using the cathode effluent 28 and/or compressor 30 air. In the run mode, any total air, oxygen or diluent demand required by the combustor 34, which is not met by the cathode effluent 28, is supplied by the compressor 30 in an amount to satisfy the heat and temperature demanded by the combustor 34 and the fuel processor 2. The air control is implemented via an air dilution valve 47 which preferably is a stepper motor driven valve having a variable orifice to control the amount of bleed-off of cathode exhaust 28 supplied to the combustor 34.

In this exemplary representation of a fuel cell apparatus, operation is as follows. At the beginning of operations when the fuel cell apparatus is cold and starting up: (1) the compressor 30 is driven by an electric motor energized from an external source (e.g., a battery) to provide the necessary system air; (2) air is introduced into the combustor 34; hydrocarbon fuel 46 (e.g., MeOH or gasoline) is injected into the combustor 34; (3) the air and fuel react in the combustor 34, where substantially complete combustion of the fuel is effected; and (4) the hot exhaust gases exiting the combustor 34 are conveyed to the selected reactors 12 associated with the fuel processor 2.

Once the reactors in the fuel processor 2 have attained adequate temperature, the reformation process begins and: (1) valve 32 is activated to direct air to the cathode side of the fuel cell 22; (2) fuel and water are fed to the fuel processor 2 to commence the reformation reaction; (3) reformate exiting the fuel processor 2 is fed to the anode side of the fuel cell 22; (4) anode effluent 26 from the fuel cell 22 is directed into the combustor 34; (5) cathode effluent 28 from the fuel cell 22 is directed into the combustor 34; (6) the fuel, air, cathode effluent 28 and anode effluent 26 are burned in the combustor 34.

Under certain conditions, the combustor 34 could operate solely on the anode and cathode effluents, without the need for additional hydrocarbon fuel 46. Under such conditions, fuel injection to the combustor 34 is discontinued. Under other conditions, e.g., increasing power demands, supplemental fuel 46 is provided to the combustor 34. It can be seen that the combustor 34 receives multiple fuels, such as a hydrocarbon fuel as well as anode effluent 26 from the anode of the fuel cell 22. Oxygen depleted exhaust air 28 from the cathode of the fuel cell 22 and air from the compressor 30 are also supplied to the combustor 34.

According to the present fuel cell system example, a controller 150 shown in FIG. 1 controls various aspects of the operation of the system shown in FIG. 1. The controller 150 may comprise any suitable microprocessor, microcontroller, personal computer, etc., which has a central processing unit capable of executing a control program and data stored in a memory. The controller 150 may be a dedicated controller specific to any of the components in FIG. 1, or implemented in software stored in the main vehicle electronic control module. Further, although software based control programs are usable for controlling system components in various modes of operation as described above, it will also be understood that the control can also be implemented in part or whole by dedicated electronic circuitry.

Figure 2:
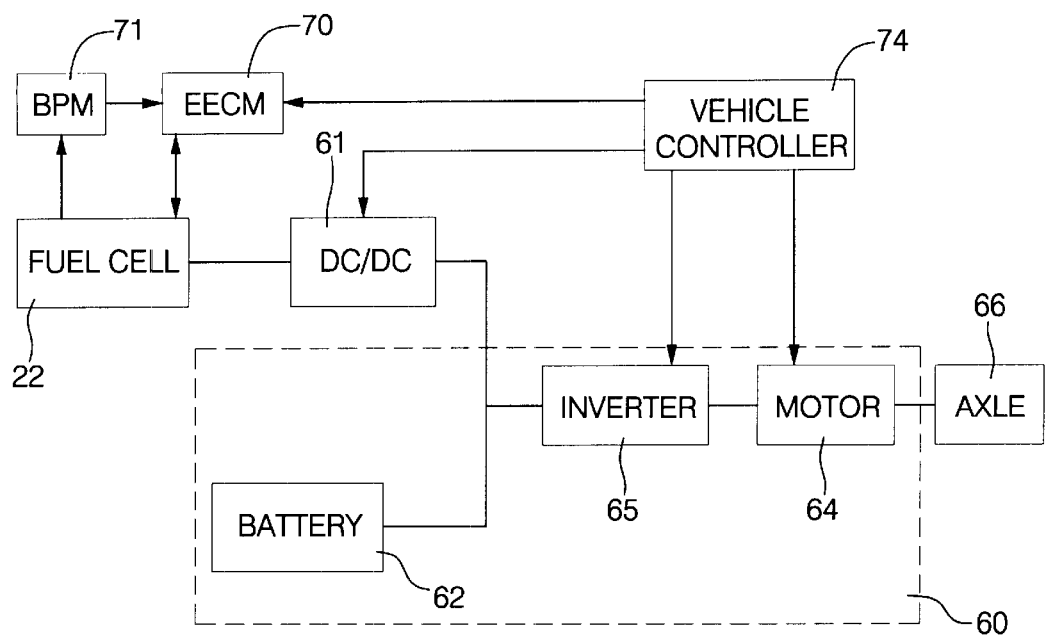
FIG. 2 is a schematic drawing of the fuel cell system shown in FIG. 1 connected in a pictorial representation of a use application.

In a preferred embodiment, the fuel cell system comprises the fuel cell 22 as part of a vehicle propulsion system 60 (see FIG. 2). Here, a portion of the external circuit 60, comprises a battery 62, an electric motor 64, and associated drive electronics 65 constructed and arranged to accept electric energy from a DC/DC converter 61 associated with the fuel cell system, and particularly fuel cell 22, and to convert it to mechanical energy produced by motor 64. The battery 62 is constructed and arranged to accept and store electrical energy supplied by fuel cell 22 and to accept and store electrical energy supplied by motor 64 during regenerative breaking, and to provide electric energy to motor 64. The motor 64 is coupled to driving axle 66 to rotate wheels of a vehicle (not shown). An electrochemical engine control module (EECM) 70 and a battery pack module (BPM) 71 monitor various operating parameters, including, but not limited to, the voltage and current of the stack. For example, this is done by the battery pack module (BPM) 71, or by the BPM 71 and the EECM 70 together, to send an output signal (message) to the vehicle controller 74 based on conditions monitored by the BPM 71. The vehicle controller 74 controls the electric motor 64, the drive electronics 65, the DC/DC converter 61, the inverter 65, and requests a power from the EECM 70.

Figure 3:
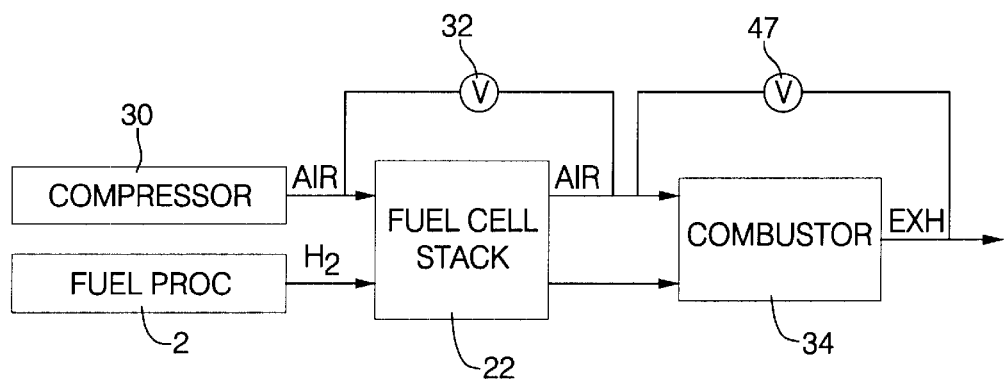
FIG. 3 is a flow diagram of a combustor temperature method and apparatus according to the present invention.

In the present fuel cell apparatus arrangement shown in FIG. 3, the fuel cell stack 22 is connected in series with the combustor 34. That is, the exhaust or effluent 28 from the cathode outlet side of the fuel cell 22 which contains oxygen depleted air is input to the combustor 34. Likewise, anode effluent 26 from the anode outlet side of the fuel cell 22 is also input to the combustor 34. Supplemental fuel through an injector, not shown, may also be supplied to the combustor 34 to provide burnable fuel during start-up or if the anode effluent output is below a nominal level.

The series connection between the fuel cell stack 22 and the combustor 34 significantly reduces the energy requirements of the air supply or compressor 30, which compressor 30 must supply all of the air to the fuel cell stack 22 and the combustor 34. Typically, current fuel cell designs are such that the fuel cell stack 22 requires more oxygen flow (in air) than the oxygen needed for a given load or amperage demand. This excess oxygen flow, called cathode lambda or $\lambda_c$ is typically about 2.0 meaning that the fuel cell stack 22 gets twice as much oxygen as needed for a given amperage or load demand. Since the fuel cell stack 22 does not consume all of the oxygen flow therethrough, an efficient fuel cell system design places the fuel cell stack 22 in series with the combustor 34 as shown in FIGS. 1 and 3.

The fuel cell stack 22 consumes oxygen, but not nitrogen so that the "air" leaving the fuel cell stack 22 has a lower oxygen to nitrogen ratio than normal air. However, for purposes of this invention, the cathode effluent 28 from the fuel cell stack 22 will still be referred to as "air".

Further, under typical operating conditions, the cathode effluent or air leaving the fuel cell stack 22 also exceeds the air requirements of the combustor 34. To prevent overcooling the combustor 34, the fast acting air bypass valve 47 is connected in the cathode effluent 28 input stream to the combustor 34 and diverts unneeded air from the air supplied to the combustor 34 to exhaust or atmosphere.

The combustor 34 needs a precise amount of air to maintain proper operating temperature. High over temperatures in the combustor 34 caused by low air flow to the combustor 34 can cause the combustor 34 to quickly overheat which can lead to degradation of combustor 34 operation. Thus, the air flow to the combustor 34 must change in proportion to fuel changes to the combustor 34. In a typical fuel cell arrangement, such as that shown in FIGS. 1 and 3, the quantity of hydrogen fuel supplied to the combustor 34 can change in milliseconds as the load changes on the fuel cell 22. For example, if 24 kW of hydrogen (expressed as the kilowatt equivalent of a given quantity of hydrogen) is supplied to the fuel cell 22, an electrical load on the fuel cell 22 may consume 20 kW. The remaining 4 kW goes to the combustor 34. If regenerative breaking occurs, the output of the fuel cell 22 may have to drop to 15 kW to prevent overloading the inverter/converter 65 during the regenerative energy capture. The fuel processor 22 cannot shutdown in milliseconds so, as the load falls, the hydrogen flow to the combustor 34 rises temporarily to about 9 kW (the previous 4 kW plus the new 5 kW) resulting from the forced drop in the fuel cell output from 20 kW to 15 kW. Without air flow rising at the same rate as the rise in hydrogen flow to the combustor 34, overtemperature in the combustor 34 may quickly occur.

Further, just as the hydrogen delivery system cannot ramp down the hydrogen flow in milliseconds, the compressor 30 cannot ramp up air flow in milliseconds. An air reserve must be available for such transients.

To address this problem, the present control method and apparatus guarantees that a small amount of air called air lambda or $\lambda_{air}$ passes through the fast acting valve 47. The present control method and apparatus controls the air demand placed on the air supply or compressor 30 by controlling the air demand to be the greater of the load air required $x_c$ or the combustor air required $x\lambda_{air}$.

In most cases, the $\lambda_c$ supplies enough excess air to keep the combustor 34 safe during all transients. In some conditions, however, including start-up when the load equals zero, the combustor 34 controls the air command to the compressor 30. The air lambda $\lambda_{air}$ provides a buffer of air ready to prevent combustor overheating.

The air lambda $\lambda_{air}$ must also have a separate value during start-up than during normal operation. During start-up, the combustor 34 turns on first to warm the fuel processor 2. As the fuel processor 2 is not yet working, the start-up fueling of the combustor 34 is different from that of normal operation. As such, stored hydrogen or the injection of a liquid fuel directly into the combustor 34 is provided for start-up fueling of the combustor 34 when the fuel processor 2 output is zero.

Regardless of the start-up procedure, a transition must occur from start-up fueling of the combustor 34 to normal fuel processor delivered fueling whereby the excess fuel lambda $\lambda_a$ output from the anode exhaust 26 of the fuel cell 22 is supplied as a fuel source to the combustor 34. When the fuel processor 2 first begins making hydrogen, plumbing and other system features create a delay before the hydrogen reaches the combustor 34. This makes it difficult to predict how to ramp out the start-up fuel source to zero. A larger buffer of air helps overcome any possible fuel differences during the transition state. During the transition state, if the combustor 34 temperature rises suddenly, the air bypass valve 47 has more than enough capacity to provide sufficient air to the combustor 34 (bypassing less air around the combustor 34) to cool the combustor 34 down to normal operating temperature.

During the critical transition or start-up states, the air lambda $\lambda_{air}$ is approximately 1.3 meaning that three units of air pass through the bypass valve 47 for every ten units of air flowing through the combustor 34. Once the fuel processor 2 starts supplying fuel or hydrogen to the combustor 34 from the anode exhaust 26 of the fuel cell 22, in an accurate, predictable manner, the air lambda $\lambda_{air}$ ramps down to 1.1 to conserve compressor 30 energy. The switch between start-up air lambda $\lambda_{air}$ (start-up) and run air lambda $\lambda_{air}$ (run) ramps slowly so that a relatively inexpensive, slow compressor 30 may be used to meet the requested air flow change. It should be noted that the 1.3 and 1.1 values for $\lambda_{air}$ can be adjusted to match specific system characteristics.

While a fast acting compressor could be employed to meet the quick air change requirements imposed on the combustor 34 to prevent overheating of the combustor 34, such a fast acting compressor requires a large, heavy motor to handle the power requirements. This makes the cost and packaging of the compressor prohibitive in most applications, such as a vehicle fuel cell system. The use of the small, fast acting air bypass valve 47 is much more economical and presents a smaller package than a quick response compressor.

The control method and apparatus of the present invention is preferably implemented in a software control program stored in the memory associated with the controller 150 and/or in the EECM 70. The controller 150 or the EECM 70 then controls the ramp down of the air lambda $\lambda_{air}$ from 1.3 to 1.1 in a slow manner.

In summary, there has been disclosed a unique method and apparatus for controlling the temperature of a combustor in a fuel cell system under all load conditions, particularly quick load changes or transients. The control method and apparatus of the present invention can be easily implemented in existing fuel cell systems and prevents overheating of the combustor by ensuring that a small reserve supply of air is readily available from the air source or compressor to meet quick air increase demands which may be imposed on the combustor due to load changes on the fuel cell stack. This reserve of air, which is in the form of a predetermined excess quantity of air normally supplied by the air source or compressor to the combustor and fuel cell stack, enables a slow response compressor to be used for a reduced manufacturing cost; while at the same time enabling the combustor and fuel cell stack to be connected in series for lower energy demands on the air supply or compressor.

What is claimed is:

1. A method for controlling the temperature of a combustor used to heat a fuel processor in a fuel cell apparatus in which the fuel processor generates hydrogen and the fuel cell discharges hydrogen containing anode effluent and oxygen containing cathode effluent, the method comprising the steps of:

connecting a cathode effluent outlet of a fuel cell to the combustor;

connecting an air flow path through the fuel cell and an air flow path through the combustor in series with an air supply;

supplying an excess quantity of air from the air supply to the fuel cell and the combustor, which excess quantity of air is in excess of the air consumed by the fuel cell and the combustor during operation;

providing an air flow bypass path in an air flow path to the combustor; and controlling the amount of the excess quantity of air which bypasses the combustor to control the temperature of the combustor under all load conditions.

2. The method of claim 1 wherein the step of supplying the excess quantity of air comprises the step of:

supplying the excess quantity of air which bypasses the combustor in a first amount during start-up of the fuel processor and in a second amount when the fuel processor reaches a nominal run condition.

3. The method of claim 2 further comprising the step of:
decreasing the amount of the excess quantity of air bypassing the combustor from the first amount to the second amount.

4. The method of claim 1 wherein the step of supplying the excess quantity of air further comprises the step of:
connecting an air bypass valve in parallel with an air flow inlet to the combustor.

5. The method of claim 4 wherein the air supply supplying air to the fuel cell and the compressor according to the step of:
supplying the excess quantity of air as the greater of the product of the load air required by the fuel cell and the cathode lambda, and the product of the combustor air requirement and the air lambda, where the cathode lambda is the ratio of oxygen sent to the fuel cell stack and the combustor to the oxygen consumed by the stack, and the air lambda is the ratio of the total air sent to the combustor and air bypass valve to the air sent to the combustor.

6. The method of claim 1, further comprising the step of providing a second air flow bypass path in an air flow path to the fuel cell in parallel with said fuel cell and in communication with the air flow path to the combustor and the air flow bypass path in the air flow path to the combustor.

7. The method of claim 6, further comprising the step of controlling the air flow in the second air flow bypass path to permit the flow of air from the air supply directly to the air flow path to the combustor during start-up.

8. The method of claim 7, wherein the step of controlling the air flow in the second air flow bypass path involves eliminating the flow of air from the air supply directly to the air flow path to the combustor during nominal operation.

9. An apparatus for controlling the operating temperature of a combustor in a fuel cell apparatus in which the fuel processor generates hydrogen and the fuel cell discharges hydrogen containing anode effluent and oxygen containing cathode effluent, the apparatus comprising:
a cathode effluent outlet of a fuel cell connected to the combustor;
an air flow path through the fuel cell and an air flow path through the combustor connected in series;
an air supply connected to the fuel cell;
the air supply being adapted to supply an excess quantity of air to the fuel cell and the combustor, which excess quantity is in excess of the air consumed by the fuel cell and the combustor during operation;
an air flow bypass path formed in parallel to an air inlet path to the combustor; and
means for controlling the amount of the excess quantity of air which bypasses the combustor to control the temperature of the combustor under any load condition.

10. The apparatus of claim 9 wherein the controlling means is adapted to supply a first amount of the excess quantity of air which bypasses the combustor during start-up of the fuel processor and a second lower amount of the excess quantity of air when the fuel processor reaches a nominal run condition.

11. The apparatus of claim 10 wherein the controlling means is adapted to decrease the amount of the excess quantity of air bypassing the combustor from the first amount to the second amount.

12. The apparatus of claim 9 further comprising:
an air bypass valve connected in parallel with an air flow inlet to the combustor, the air bypass valve being adapted to be responsive to the controlling means for controlling the amount of the excess quantity of air which bypasses the combustor.

13. The apparatus of claim 9 wherein the air supply is adapted to supply a quantity of air to the fuel cell and the combustor which is the greater of the product of the load air requirement and the cathode lambda, and the product of the combustor air requirement and the air lambda, where the cathode lambda is the ratio of oxygen sent to the fuel cell stack and the combustor to the oxygen consumed by the stack, and the air lambda is the ratio of the total air sent to the combustor and air bypass valve to the air sent to the combustor.

14. The apparatus of claim 9, further comprising a second air flow bypass path in an air flow path to the fuel cell in parallel with said fuel cell and in communication with the air flow path to the combustor and the air flow bypass path in the air flow path to the combustor.

15. The apparatus of claim 14, further comprising a second valve in said second air flow bypass path which is at least partially open to permit the flow of air from the air supply through said second air flow bypass path to the air flow path to the combustor during start-up.

16. The apparatus of claim 14, wherein the second valve is closed to eliminate the flow of air from the air supply through said second air flow bypass path to the air flow path to the combustor during nominal operation.

* * * * *